(12) United States Patent
Tsukagoshi

(10) Patent No.: US 10,812,854 B2
(45) Date of Patent: Oct. 20, 2020

(54) IMAGE PROCESSING DEVICE, IMAGE PROCESSING METHOD, RECEPTION DEVICE, AND TRANSMISSION DEVICE

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 150 days.

(21) Appl. No.: 15/570,536

(22) PCT Filed: May 10, 2016

(86) PCT No.: PCT/JP2016/063902
§ 371 (c)(1),
(2) Date: Oct. 30, 2017

(87) PCT Pub. No.: WO2016/185947
PCT Pub. Date: Nov. 24, 2016

(65) Prior Publication Data
US 2018/0146235 A1 May 24, 2018

(30) Foreign Application Priority Data
May 19, 2015 (JP) .................................. 2015-101964

(51) Int. Cl.
*H04N 21/431* (2011.01)
*H04N 21/235* (2011.01)
(Continued)

(52) U.S. Cl.
CPC ........... *H04N 21/431* (2013.01); *H04N 5/232* (2013.01); *H04N 19/117* (2014.11); *H04N 19/61* (2014.11);
(Continued)

(58) Field of Classification Search
CPC .... H04N 19/117; H04N 19/176; H04N 19/61; H04N 21/235; H04N 21/431;
(Continued)

(56) References Cited

U.S. PATENT DOCUMENTS

2008/0313152 A1* 12/2008 Yoon ..................... G06F 16/783
2009/0316009 A1* 12/2009 Ito ........................... H04N 5/243
348/208.4
(Continued)

FOREIGN PATENT DOCUMENTS

| JP | 2010-178124 A | 8/2010 |
|---|---|---|
| JP | 2011-49633 A | 3/2011 |
| JP | 2012-169701 A | 9/2012 |

OTHER PUBLICATIONS

International Search Report dated Aug. 9, 2016, in PCT/JP2016/063902 filed May 10, 2016.

*Primary Examiner* — Md N Haque
(74) *Attorney, Agent, or Firm* — Oblon, McClelland, Maier & Neustadt, L.L.P.

(57) ABSTRACT

The present technology makes it possible for a conventional frame interpolation technology to handle moving image data captured with a high-speed frame shutter and having a high sharpness image component.

Moving image data at a predetermined frame rate and a predetermined resolution is acquired. When a ratio of the predetermined frame rate to a camera shutter speed falls below a threshold value, filtering processing for raising the degree of correlation between adjacent frames is performed on the acquired moving image data. For example, the camera shutter speed is estimated on the basis of information on the frame rate and the resolution.

12 Claims, 16 Drawing Sheets

(51) Int. Cl.
*H04N 21/435* (2011.01)
*H04N 21/4402* (2011.01)
*H04N 21/434* (2011.01)
*H04N 5/232* (2006.01)
*H04N 19/117* (2014.01)
*H04N 19/61* (2014.01)
*H04N 19/176* (2014.01)

(52) U.S. Cl.
CPC ......... *H04N 21/235* (2013.01); *H04N 21/435* (2013.01); *H04N 21/4345* (2013.01); *H04N 21/440281* (2013.01); *H04N 19/176* (2014.11)

(58) Field of Classification Search
CPC ............. H04N 21/4345; H04N 21/435; H04N 21/440281; H04N 5/232
See application file for complete search history.

(56) References Cited

U.S. PATENT DOCUMENTS

| | | | | |
|---|---|---|---|---|
| 2010/0277613 | A1* | 11/2010 | Seki | H04N 5/232 348/231.2 |
| 2011/0234829 | A1* | 9/2011 | Gagvani | H04N 5/232 348/222.1 |
| 2013/0314603 | A1* | 11/2013 | Ikeda | H04N 5/23229 348/607 |
| 2013/0315573 | A1* | 11/2013 | Sasaki | H04N 19/30 386/356 |
| 2014/0186048 | A1* | 7/2014 | Oshima | H04B 10/541 398/118 |

* cited by examiner

Coding Parameter_descriptor syntax

| Syntax | No. of Bits | Format |
|---|---|---|
| Coding Parameter_descriptor ( ) { | | |
|     coding parameter_descriptor _tag | 8 | uimsbf |
|     coding parameter_descriptor length | 8 | uimsbf |
|     service_quality_type | 4 | uimsbf |
|     temporal_scalablility_flag | 1 | bslbf |
|     reserved | 3 | 0x7 |
|     Resolution_type | 8 | uimsbf |
|     FrameRate_type | 8 | uimsbf |
| } | | |

FIG. 6 semantics

```
service_quality_type (4bits)
        0x01      SUPER HIGH-DEFINITION VIDEO DISTRIBUTION
        0x10      HIGH-DEFINITION VIDEO DISTRIBUTION temporal_scalablility_flag  (1bit)
        1         INDICATES THAT MULTIPLE STREAM CONFIGURATION HAVING TEMPORAL
                  SCALABILITY IS USED
        0         INDICATES THAT SINGLE STREAM CONFIGURATION NOT HAVING TEMPORAL
                  SCALABILITY IS USED Resolution_type  (8bits)
        0x01    1920 x 1080
        0x02    3840 x 2160
        0x03    7680 x 4320

FrameRate_type  (8bits)     REPRESENTS FRAME RATE OF ENTIRE DISTRIBUTION
        0x01    30Hz
        0x02    60Hz
        0x03    120Hz
```

FIG. 7

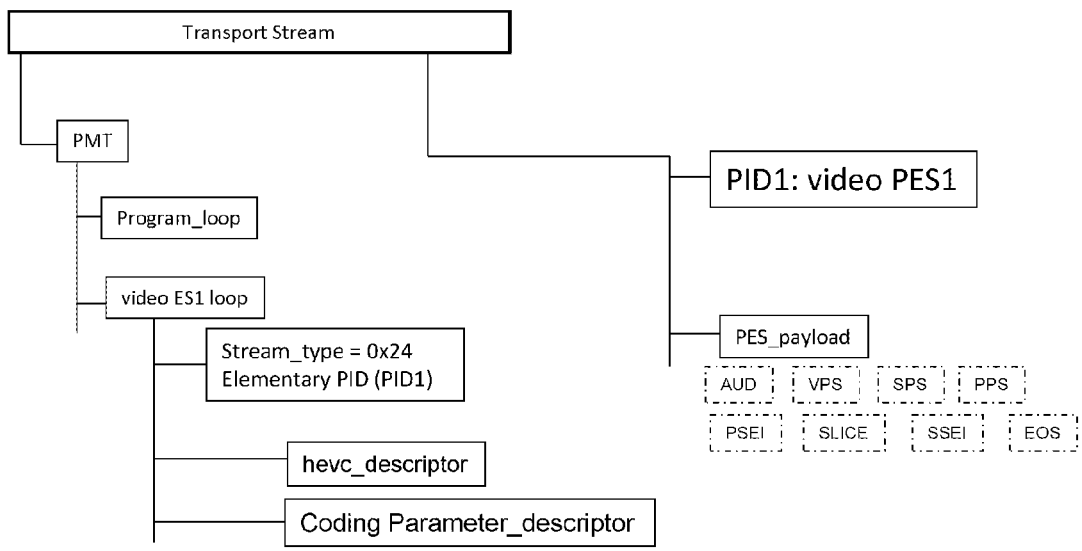

FIG. 11

SHUTTER SPEED ESTIMATION TABLE

|  |  | Resolution | | |
|---|---|---|---|---|
|  |  | 1920 x 1080 | 3840 x 2160 | 7680 x 4320 |
| Frame Rate | 25 Hz / 30Hz | Normal Shutter Speed | Normal Shutter Speed | Normal Shutter Speed |
|  | 50 Hz / 60 Hz | Normal Shutter Speed | Short Shutter Speed | Short Shutter Speed |
|  | 100 Hz / 120 Hz | Short Shutter Speed | Short Shutter Speed | Short Shutter Speed |

INTERPOLATION FRAME GENERATION USING INTERFRAME MOTION VECTOR

N−1 FRAME

INTERPOLATION FRAME

N FRAME

SuperHighQuality_descriptor syntax

| Syntax | No. of Bits | Format |
|---|---|---|
| SuperHighQuality_descriptor ( ) { | | |
|    superhighquality_descriptor_tag | 8 | uimsbf |
|    superhighquality_descriptor length | 8 | uimsbf |
|    service_quality_type | 4 | uimsbf |
|    temporal_scalablility_flag | 1 | bslbf |
|    reserved | 3 | 0x7 |
| } | | |

FrameQuality_descriptor syntax

| Syntax | No. of Bits | Format |
|---|---|---|
| FrameQuality_descriptor ( ) { | | |
|    framequality_descriptor _tag | 8 | uimsbf |
|    framequality_descriptor length | 8 | uimsbf |
|    service_quality_type | 4 | uimsbf |
|    temporal_scalablility_flag | 1 | bslbf |
|    ratio_shutter_speed_vs_frame_rate | 3 | bslbf |
| } | | |

FIG. 17

```
semantics service_quality_type (4bits)
    0x01        SUPER HIGH-DEFINITION VIDEO DISTRIBUTION
    0x10        HIGH-DEFINITION VIDEO DISTRIBUTION temporal_scalablility_flag (1bit)
    1           INDICATES THAT MULTIPLE STREAM CONFIGURATION HAVING TEMPORAL
                SCALABILITY IS USED
    0           INDICATES THAT SINGLE STREAM CONFIGURATION NOT HAVING TEMPORAL
                SCALABILITY IS USED ratio_shutter_speed_vs_frame_rate (3bits)    REPRESENTS RATIO OF IMAGE FRAME RATE
                                             TO CAMERA SHUTTER SPEED
    0x0         100 %   (SHUTTER SPEED IS SAME AS IMAGE FRAME RATE)
    0x1         50 %    (SHUTTER SPEED IS TWICE IMAGE FRAME RATE)
    0x2         33 %    (SHUTTER SPEED IS THREE TIMES IMAGE FRAME RATE)
    0x3         25 %    (SHUTTER SPEED IS FOUR TIMES IMAGE FRAME RATE)
    others      reserved
```

FrameQuality_SEI

| Syntax | No. of Bits | Format |
|---|---|---|
| FrameQuality_SEI ( ) { | | |
|   FrameQuality_id | ue(v) | |
|   FrameQuality_cancel_flag | u(1) | bslbf |
|   if( ! FrameQuality_cancel_flag ) { | | |
|     service_quality_type | 4 | uimsbf |
|     temporal_scalablility_flag | 1 | bslbf |
|     ratio_shutter_speed_vs_frame_rate | 3 | bslbf |
| } | | |

IMAGE PROCESSING DEVICE, IMAGE PROCESSING METHOD, RECEPTION DEVICE, AND TRANSMISSION DEVICE

TECHNICAL FIELD

The present technology relates to an image processing device, an image processing method, a reception device, and a transmission device. In more detail, the present technology relates to an image processing device and so on that process moving image data captured by a camera with a high-speed frame shutter.

BACKGROUND ART

In recent years, cameras that perform high frame rate capturing with a high-speed frame shutter have been known (for example, refer to Patent Document 1). For example, while a normal frame rate is 60 fps, 50 fps, and the like, the high frame rate has a frame rate of several times or several tens of times, or even several hundred times the above frame rate.

When services at a high frame rate are performed, it is conceivable to convert a moving image captured by a camera with a high-speed frame shutter to a moving image sequence with a frequency lower than that of the original moving image to transmit. However, while an image by the high-speed frame shutter has the effect of improving motion blurring and realizing image quality with high sharpness, when a shutter aperture ratio at a receiving/reproducing side is low, such an image has factors that cause image quality problems in a conventional frame interpolation technology.

That is, since a difference between a case where a motion vector search is appropriate and a case where it is not appropriate increases in frame interpolation using a moving image with high sharpness captured with the high-speed frame shutter, there is a possibility of deterioration in image quality appearing with a remarkable difference between both when displayed. At the time of frame interpolation, high load calculation is required to enhance the accuracy of the motion vector search, but it affects a receiver cost.

CITATION LIST

Patent Document

Patent Document 1: Japanese Patent Application Laid-Open No. 2010-178124

SUMMARY OF THE INVENTION

Problems to be Solved by the Invention

An object of the present technology is to make it possible for a conventional frame interpolation technology to handle moving image data with a high sharpness image component captured with a high-speed frame shutter.

Solutions to Problems

A concept of the present technology is an image processing device including:

an image data acquiring unit that acquires moving image data at a predetermined frame rate and a predetermined resolution; and an image processing unit that performs filtering processing for raising the degree of correlation between adjacent frames on the acquired moving image data when a ratio of the predetermined frame rate to a camera shutter speed falls below a threshold value.

In the present technology, the moving image data at the predetermined frame rate and the predetermined resolution is acquired by the image data processing unit. When the ratio of the predetermined frame rate to the camera shutter speed falls below the threshold value, the filtering processing for raising the degree of correlation between adjacent frames is performed on the acquired moving image data by the image processing unit. For example, the image processing unit may estimate the camera shutter speed on the basis of information on the frame rate and the resolution. In addition, for example, information on the ratio of the frame rate to the camera shutter speed may be inserted in a layer of the container and/or a layer of the video stream, and the image processing unit may obtain the ratio of the predetermined frame rate to the camera shutter speed on the basis of the information on the ratio inserted in the layer of the container and/or the layer of the video stream.

In addition, for example, the image data acquiring unit may receive a container in a predetermined format including a video stream obtained by applying encoding processing to the moving image data and acquire the moving image data by applying decoding processing to this video stream. In this case, for example, the image processing unit may estimate the camera shutter speed on the basis of information on the frame rate and the resolution inserted in a layer of the container. In addition, in this case, for example, the image processing unit may estimate the camera shutter speed on the basis of information on the frame rate and the resolution inserted in a layer of the video stream.

In addition, for example, the image data acquiring unit may acquire the moving image data from an external apparatus via a digital interface. In this case, for example, the image processing unit may estimate the camera shutter speed on the basis of information on the frame rate and the resolution inserted in a blanking period of the moving image data. In addition, in this case, for example, the image processing unit may acquire information on the ratio of the frame rate to the camera shutter speed from the external apparatus via the digital interface and, on the basis of this information on the ratio, obtain the ratio of the predetermined frame rate to the camera shutter speed.

As described above, in the present technology, when the ratio of the predetermined frame rate to the camera shutter speed falls below the threshold value, the filtering processing for raising the degree of correlation between adjacent frames is performed on the moving image data at the predetermined frame rate and the predetermined resolution. Therefore, it becomes possible for a conventional frame interpolation technology to handle moving image data captured with a high-speed frame shutter and having a high sharpness image component.

Meanwhile, in the present technology, for example, the image data acquiring unit may receive a container in a predetermined format including a video stream obtained by applying encoding to the moving image data and acquire the moving image data by applying decoding to this video stream, and, in a case where information indicating whether super high-definition video distribution is delivered, which is inserted in a layer of the container, indicates that the super high-definition video distribution is delivered, the image processing unit may perform the filtering processing for raising the degree of correlation between adjacent frames on the acquired moving image data when the ratio of the predetermined frame rate to the camera shutter speed falls below the threshold value. In this case, it becomes possible to perform the filtering processing only on moving image data captured with a high-speed frame shutter and having a high sharpness image component.

Furthermore, another concept of the present technology is a reception device including:

a receiving unit that receives a container in a predetermined format including a video stream obtained by applying encoding to moving image data; and a control unit that controls decoding processing of applying decoding to the video stream to obtain moving image data at a predetermined frame rate and a predetermined resolution, interpolation processing of adjusting the frame rate of the moving image data obtained by the decoding processing to a display capability by generating an interpolation frame using an interframe motion vector, and filtering processing for raising the degree of correlation between adjacent frames to be performed on the moving image data obtained by the decoding processing when a ratio of the predetermined frame rate to a camera shutter speed falls below a threshold value.

According to the present technology, the container in the predetermined format including the video stream obtained by applying encoding to the moving image data is received by the receiving unit. The decoding processing, the interpolation processing, and the filtering processing are controlled by the control unit. In the decoding processing, decoding is applied to the video stream to obtain the moving image data at the predetermined frame rate and the predetermined resolution. In addition, in the interpolation processing, the frame rate of this moving image data is adjusted to the display capability by generating the interpolation frame using the interframe motion vector.

In addition, in the filtering processing, when the ratio of the predetermined frame rate to the camera shutter speed falls below a threshold value, the degree of correlation between adjacent frames is raised on the moving image data.

As described above, in the present technology, when the ratio of the predetermined frame rate to the camera shutter speed falls below the threshold value, the filtering processing for raising the degree of correlation between adjacent frames is performed on the moving image data at the predetermined frame rate and the predetermined resolution obtained by the decoding processing. Therefore, in the interpolation processing, frame interpolation can be satisfactorily performed with a conventional frame interpolation technology.

Furthermore, another concept of the present technology is a reception device including:

a receiving unit that receives moving image data at a predetermined frame rate and a predetermined resolution from an external apparatus via a digital interface; and a control unit that controls interpolation processing of adjusting the frame rate of the moving image data received by the receiving unit to a display capability by generating an interpolation frame using an interframe motion vector, and filtering processing for raising the degree of correlation between adjacent frames to be performed on the acquired moving image data when a ratio of the predetermined frame rate to a camera shutter speed falls below a threshold value.

In the present technology, the moving image data at the predetermined frame rate and the predetermined resolution is received from the external apparatus by the receiving unit via the digital interface. For example, the digital interface may be the high-definition multimedia interface (HDMI). The interpolation processing and the filtering processing are controlled by the control unit.

In the interpolation processing, the frame rate of the moving image data is adjusted to the display capability by generating the interpolation frame using the interframe motion vector. In the filtering processing, when the ratio of the predetermined frame rate to the camera shutter speed falls below the threshold value, the filtering processing for raising the degree of correlation between adjacent frames is performed on the moving image data.

As described above, in the present technology, when the ratio of the predetermined frame rate to the camera shutter speed falls below the threshold value, the filtering processing for raising the degree of correlation between adjacent frames is performed on the moving image data at the predetermined frame rate and the predetermined resolution received by the receiving unit. Therefore, in the interpolation processing, frame interpolation can be satisfactorily performed with a conventional frame interpolation technology.

Furthermore, another concept of the present technology is a transmission device including:

an image encoding unit that generates a video stream by applying encoding to moving image data;

a transmitting unit that transmits a container in a predetermined format including the video stream; and an information inserting unit that inserts, into a layer of the container, information on a frame rate and a resolution corresponding to information on a frame rate and a resolution inserted in a layer of the video stream.

In the present technology, encoding is applied to the moving image data by the image encoding unit such that the video stream is generated. The container in the predetermined format including this video stream is transmitted by the transmitting unit. For example, the container may be a transport stream (MPEG-2 TS) adopted in a digital broadcasting standard. Alternatively, for example, the container may be MP4 used for distribution in the Internet or the like, or a container of a format other than MP4. The information on the frame rate and the resolution corresponding to the information on the frame rate and the resolution inserted in the layer of the video stream is inserted into the layer of the container by the information inserting unit.

In this manner, in the present technology, the information on the frame rate and the resolution corresponding to the information on the frame rate and the resolution inserted in the layer of the video stream is inserted into the layer of the container. Therefore, it becomes possible for a receiving side to acquire the information on the frame rate and the resolution from the layer of the container.

Meanwhile, in the present technology, for example, the information inserting unit may further insert information indicating whether super high-definition video distribution is delivered into the layer of the container. In this case, it becomes possible for a receiving side to easily acquire the information indicating whether the super high-definition video distribution is delivered from the layer of the container.

Furthermore, a concept of the present technology is a transmission device including:

an image encoding unit that generates a video stream by applying encoding to moving image data;

a transmitting unit that transmits a container in a predetermined format including the video stream; and an information inserting unit that inserts information indicating whether super high-definition video distribution is delivered into a layer of the container.

In the present technology, encoding is applied to the moving image data by the image encoding unit such that the video stream is generated. The container in the predetermined format including this video stream is transmitted by the transmitting unit. For example, the container may be a transport stream (MPEG-2 TS) adopted in a digital broadcasting standard. Alternatively, for example, the container may be MP4 used for distribution in the Internet or the like, or a container of a format other than MP4. The information indicating whether the super high-definition video distribution is delivered is inserted into the layer of the container by the information inserting unit.

As described above, in the present technology, the information indicating whether the super high-definition video distribution is delivered is inserted into the layer of the container. Therefore, it becomes possible for a receiving side to acquire the information indicating whether the super high-definition video distribution is delivered from the layer of the container.

Furthermore, a concept of the present technology is a transmission device including:

an image encoding unit that generates a video stream by applying encoding processing to moving image data;

a transmitting unit that transmits a container in a predetermined format including the video stream; and an information inserting unit that inserts information on a ratio of a frame rate to a camera shutter speed into a layer of the container and a layer of the video stream.

In the present technology, encoding is applied to the moving image data by the image encoding unit such that the video stream is generated. The container in the predetermined format including this video stream is transmitted by the transmitting unit. For example, the container may be a transport stream (MPEG-2 TS) adopted in a digital broadcasting standard. Alternatively, for example, the container may be MP4 used for distribution in the Internet or the like, or a container of a format other than MP4. The information on the ratio of the frame rate to the camera shutter speed is inserted into the layer of the container and the layer of the video stream by the information inserting unit.

As described above, in the present technology, the information on the ratio of the frame rate to the camera shutter speed is inserted into the layer of the container and the layer of the video stream. Therefore, it becomes possible for a receiving side to acquire the information on the ratio of the frame rate to the camera shutter speed from the layer of the container and the layer of the video stream.

Meanwhile, in the present technology, for example, the information inserting unit may further insert information indicating whether super high-definition video distribution is delivered into the layer of the container and the layer of the video stream. In this case, it becomes possible for a receiving side to easily acquire the information indicating whether the super high-definition video distribution is delivered from the layer of the container and the layer of the video stream.

Effects of the Invention

According to the present technology, it becomes possible for a conventional frame interpolation technology to handle moving image data captured with a high-speed frame shutter and having a high sharpness image component. Note that the effects described herein are not necessarily limited and any effects described in the present disclosure may be applied.

BRIEF DESCRIPTION OF DRAWINGS

FIG. 6 is a diagram illustrating the contents of primary information in the example of the structure of the coding parameter descriptor.

FIG. 7 is a diagram illustrating a configuration example of a transport stream TS in the case of performing distribution by a single stream.

FIG. 11 is a diagram illustrating an example of a shutter speed estimation table.

FIG. 17 is a diagram illustrating the contents of primary information in the example of the structure of the frame quality descriptor.

MODE FOR CARRYING OUT THE INVENTION

Modes for carrying out the invention (hereinafter, referred to as "embodiments") will be described below. Note that the description will be given in the following order.
1. Embodiments
2. Variations 1. Embodiments

Figure 1:
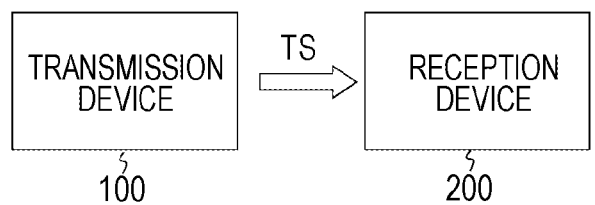
FIG. 1 is a block diagram illustrating a configuration example of a transmission/reception system serving as an embodiment.

[Transmission/Reception System]
FIG. 1 illustrates a configuration example of a transmission/reception system 10 serving as an embodiment. This transmission/reception system 10 has a configuration including a transmission device 100 and a reception device 200.

The transmission device 100 incorporates a transport stream TS as a container into a broadcasting wave to transmit. This transport stream TS includes one or a plurality of video streams obtained by encoding moving image data. In this case, for example, encoding such as H.264/AVC or H.265/HEVC is applied.

Here, the moving image data includes, in addition to data of a moving image captured with a normal frame shutter such as 30 Hz or 60 Hz, data of a moving image captured with a high-speed frame shutter such as 120 Hz or 240 Hz or data of a moving image obtained by converting such a moving image into a low-frequency moving image sequence, and the like. The moving image data captured with a high-speed frame shutter has a high sharpness image component. Therefore, when a shutter aperture ratio at a receiving/reproducing side is lowered, such moving image data has factors that cause image quality problems in a conventional frame interpolation technology.

Figure 2:
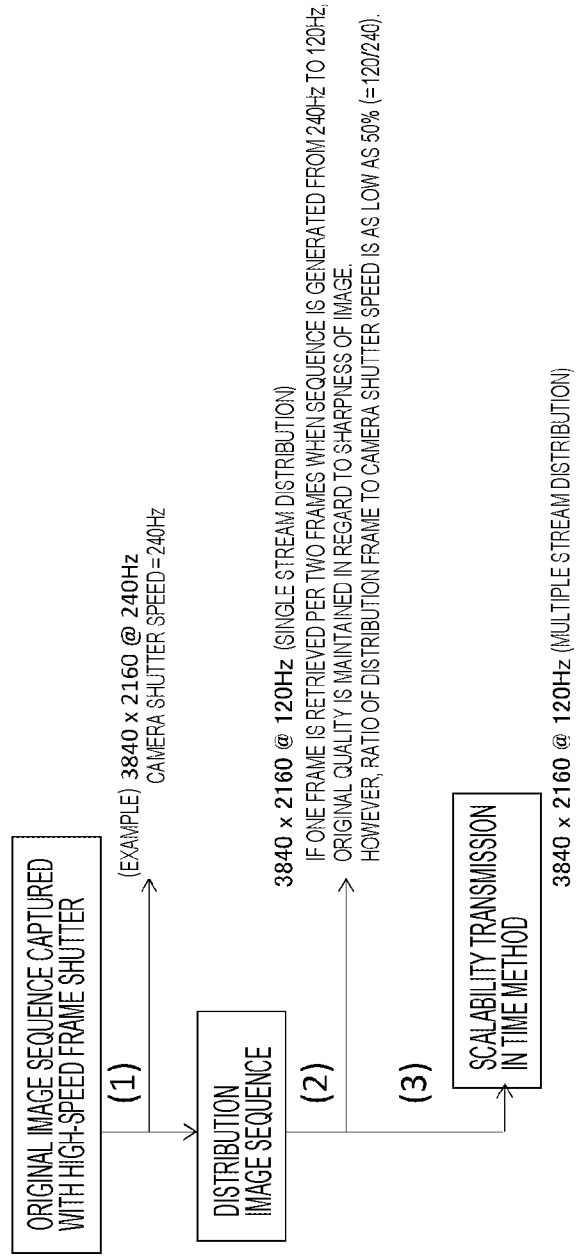
FIG. 2 is a diagram for explaining a relationship between a camera shutter speed and a frame rate from image sequence production to distribution at a transmitting side.

For example, as illustrated in FIG. 2, (1) an original image sequence captured with a high-speed frame shutter has a camera shutter speed of 240 Hz and a 4K resolution of 3840×2160 and is converted into a distribution image sequence having a frame rate of 120 Hz and a 4K resolution of 3840×2160 to be transmitted.

(2) In the case of single stream distribution, if one frame is retrieved per two frames when a sequence is generated from 240 Hz to 120 Hz, the original quality at the time of capturing is maintained in regard to the sharpness of the image. However, a ratio of a distribution frame rate to the camera shutter speed is as low as 50% (=120/240).

(3) In the case of multiple stream distribution, here, in the case of two stream distribution (scalability transmission in a time direction), images of the sequence with a ratio to the camera shutter speed of 50% mentioned in (2) are alternately retrieved such that one is assigned to a base group (Base Group) and the other is assigned to an enhanced group (Enhanced Group). The frame rate of the base group is 60 Hz and likewise, the frame rate of the enhanced group is also 60 Hz.

In a case where both of the base group and the enhanced group are decoded and displayed, since the frame rate of the entire image sequence to be displayed is 120 Hz, the ratio to the camera shutter speed is 50%, which is comparable with the distribution by the single stream. However, in a case where only the base group is displayed, the frame rate is 60 Hz and the ratio to the camera shutter speed is further lowered to 25% (=60/240).

Figure 3:
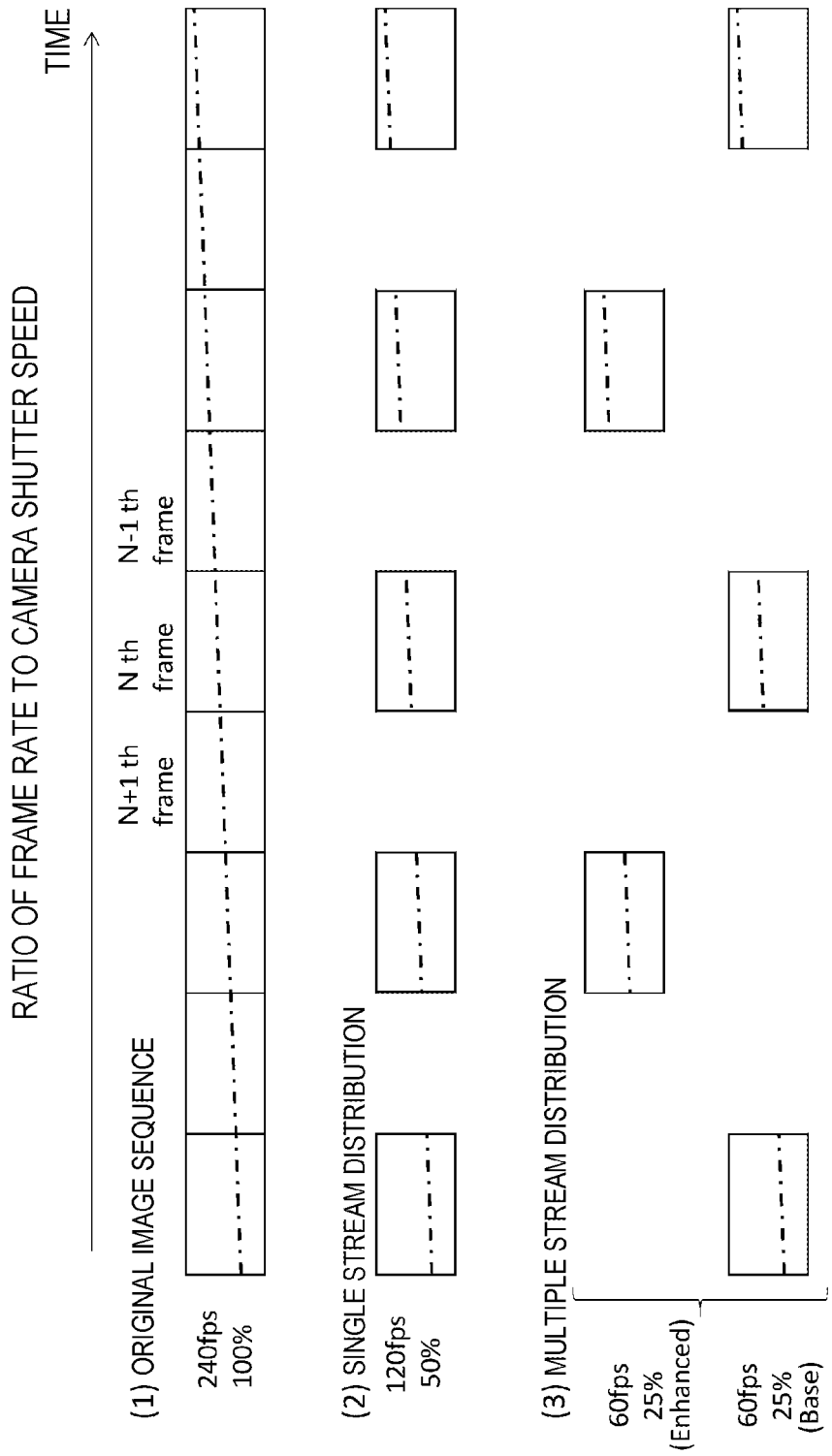
FIG. 3 is a diagram for explaining a ratio of a frame rate to a camera shutter speed.

FIG. 3 illustrates a ratio of a frame rate to a camera shutter speed. In the case of an original image sequence, the ratio is 100% (=240/240). In the case of single stream distribution, the ratio is 50% (=120/240). In the case of multiple stream distribution, the ratio of each of the base group and the enhanced group is 25% (=60/240) and, when both are combined, the ratio becomes 50% (60*2/240). In a case where only the base group is displayed, the ratio is 25%. As is clear from the illustrated example, the lower the ratio, the lower the correlation between preceding and succeeding frames.

Returning to FIG. 1, the transmission device 100 inserts information on the frame rate and the resolution into a layer of the transport stream TS as a container. In a network abstraction layer (NAL) unit of a sequence parameter set (SPS) of the video stream, information on the frame rate and the resolution is present. As described above, the information on the frame rate and the resolution to be inserted into the layer of the transport stream TS corresponds to the SPS NAL unit of the video stream. By inserting the information on the frame rate and the resolution into the layer of the transport stream TS in this manner, a receiving side can easily acquire this information on the frame rate and the resolution from the layer of the transport stream TS.

In addition, the transmission device 100 inserts information indicating whether super high-definition video distribution is delivered into the layer of the transport stream TS as a container. For example, high-definition video distribution includes distribution of a moving image captured with a high-speed frame shutter such as 120 Hz or 240 Hz as it is, or distribution of a moving image obtained by simply retrieving a predetermined frame from such a moving image to convert into a low-frequency moving image sequence while the sharpness of the image is maintained. By inserting the information indicating whether the super high-definition video distribution is delivered into the layer of the transport stream TS in this manner, a receiving side can easily acquire this information indicating whether the super high-definition video distribution is delivered from the layer of the transport stream TS.

In this embodiment, the transmission device 100 inserts the information on the frame rate and the resolution and the information indicating whether the super high-definition video distribution is delivered that have been described above, for example, into the inside of a video elementary stream loop arranged under a program map table in correspondence with the video stream, as a descriptor. Details of this descriptor will be described later.

The reception device 200 receives the above-described transport stream TS sent from the transmission device 100 by being incorporated into the broadcasting wave. This transport stream TS includes one video stream obtained by encoding moving image data or a plurality of video streams (for example, two video streams of a base stream and an enhanced stream). The reception device 200 applies decoding to the video stream to obtain moving image data at a predetermined frame rate and a predetermined resolution.

In this case, in a case where the moving image data is distributed in a single stream, the reception device 200 applies decoding processing to this single stream to obtain the moving image data at the predetermined frame rate and the predetermined resolution. In addition, in this case, in a case where the moving image data is distributed in multiple streams, the reception device 200 applies decoding processing to a predetermined number of streams according to a decoding capability to obtain the moving image data at the predetermined frame rate and the predetermined resolution.

For example, in a case where the moving image data is distributed in two streams, namely, the base stream and the enhanced stream, only the base stream or both of the base stream and the enhanced stream are decoded to obtain the moving image data at the predetermined frame rate and the predetermined resolution.

The reception device 200 applies interpolation processing for generating an interpolation frame using an interframe motion vector to the moving image data at the predetermined frame rate and the predetermined resolution obtained by the decoding processing and obtains moving image data for display. Here, when the ratio of the predetermined frame rate to the camera shutter speed falls below a threshold value, the reception device 200 carries out, prior to the interpolation processing, filtering processing for raising the degree of correlation between adjacent frames on the moving image data obtained by the decoding processing. By performing this filtering processing, frame interpolation can be satisfactorily performed with a conventional frame interpolation technology.

The reception device 200 estimates the camera shutter speed on the basis of the information on the frame rate and the resolution. For example, the reception device 200 uses the information on the frame rate and the resolution inserted in the layer of the transport stream TS as a container or inserted in the layer of the video stream.

Note that the filtering processing described above focuses on avoiding image quality problems caused in a case where interpolation is performed with a conventional frame interpolation technology while the sharpness of the image owing to high-speed frame shutter capturing is maintained in each frame constituting the moving image obtained by the decoding processing. In this embodiment, in a case where the information indicating whether the super high-definition video distribution is delivered, which is inserted in the layer of the transport stream TS as a container, indicates that the super high-definition video distribution is delivered, the reception device 200 carries out the above-described filtering processing.

[Configuration of Transmission Device]

Figures 4, 5:
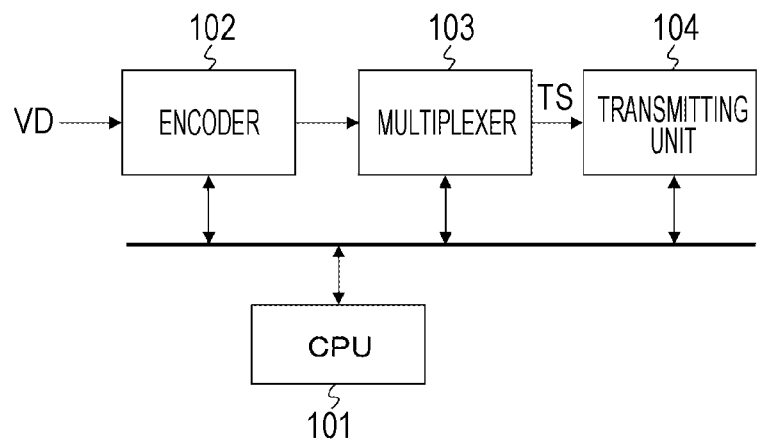
FIG. 4 is a block diagram illustrating a configuration example of a transmission device.
FIG. 5 is a diagram illustrating an example of the structure of a coding parameter descriptor.

FIG. 4 illustrates a configuration example of the transmission device 100. This transmission device 100 has a central processing unit (CPU) 101, an encoder 102, a multiplexer 103, and a transmitting unit 104. The CPU 101 is a control unit and controls the action of each member of the transmission device 100.

The encoder 102 accepts the input of moving image data VD that is not compressed and constitutes the distribution image sequence. Then, the encoder 102 applies the encoding processing such as H.264/AVC or H.265/HEVC to this moving image data VD and generates one video stream in the case of the single stream distribution and a plurality of video streams in the case of the multiple stream distribution. Hereinafter, for simplicity of explanation, this embodiment assumes that the plurality of video streams is two video streams of the base stream and the enhanced stream.

The multiplexer 103 converts the video stream generated by the encoder 102 into a packetized elementary stream (PES) packet and further converts the PES packet into a transport packet to multiplex, thereby obtaining the transport stream TS as a multiplexed stream. In this embodiment, this transport stream TS includes only the base stream or both of the base stream and the enhanced stream.

In addition, the multiplexer 103 inserts the information on the frame rate and the resolution and the information indicating whether the super high-definition video distribution is delivered into the layer of the transport stream TS as a container. These pieces of information are inserted as descriptors into the inside of the video elementary stream loop arranged under the program map table in correspondence with the video stream. The transmitting unit 104 incorporates the transport stream TS obtained by the multiplexer 103 into the broadcasting wave to transmit to the reception device 200.

[About Insertion of Information]

The insertion of information in the multiplexer 103 will be further described. The multiplexer 103 inserts a coding parameter descriptor (Coding Parameter_descriptor) to be newly defined. FIG. 5 illustrates an example of the structure of the coding parameter descriptor (Syntax). FIG. 6 illustrates the contents of primary information (Semantics) in the above example of the structure.

An eight-bit field of "coding parameter_descriptor_tag" represents a descriptor type. "coding parameter_descriptor_tag" here represents that it is a coding parameter descriptor. An eight-bit field of "coding parameter_descriptor length" represents a length (size) of the descriptor and indicates the number of subsequent bytes as the length of the descriptor. "coding parameter_descriptor length" here represents three bytes.

A four-bit field of "service_quality_type" represents whether the super high-definition video distribution is delivered. "0x01" indicates that the super high-definition video distribution is delivered. "0x10" indicates that merely high-definition video distribution is delivered. A one-bit field of "temporal_scalablility_flag" represents whether a multiple stream configuration having temporal scalability is used. "1" indicates that the multiple stream configuration having the temporal scalability is used. "0" indicates that a single stream configuration not having the temporal scalability is used.

An eight-bit field of "Resolution_type" represents the resolution. For example, "0x01" indicates a resolution of 1920×1080, that is, HD resolution, "0x02" indicates a resolution of 3840×2160, that is, 4K resolution, and "0x03" indicates a resolution of 7680×4320, that is, 8K resolution. An eight-bit field of "FrameRate_type" represents the frame rate of the entire distribution. For example, "0x01" indicates 30 Hz, "0x02" indicates 60 Hz, and "0x03" indicates 120 Hz.

[Configuration of Transport Stream TS]

FIG. 7 illustrates a configuration example of the transport stream TS in the case of performing distribution by the single stream. This transport stream TS includes one video stream. That is, according to this configuration example, there is a PES packet "video PES1" for the video stream. Encoded image data of each picture included in a PES payload is constituted by NAL units such as "AUD", "VPS", "SPS", "PPS", "PSEI", "SLICE", "SSEI", and "EOS".

Additionally, the program map table (PMT) is included in the transport stream TS as program specific information (PSI). This PSI is information mentioning which program is the one to which each elementary stream included in the transport stream belongs. The PMT has a program loop (Program loop) stating information relating to the entire program. In addition, the PMT has an elementary stream loop having information relating to each of the elementary streams. According to this configuration example, there is a video elementary stream loop (video ES1 loop).

Information such as a stream type and a packet identifier (PID) is arranged in the video elementary stream loop in correspondence with the video stream (video PES1) and at the same time, a descriptor stating information relating to this video stream is also arranged therein. As one of such descriptors, an HEVC descriptor (HEVC_descriptor) and the above-described coding parameter descriptor (Coding Parameter_descriptor) are inserted.

Figure 8:
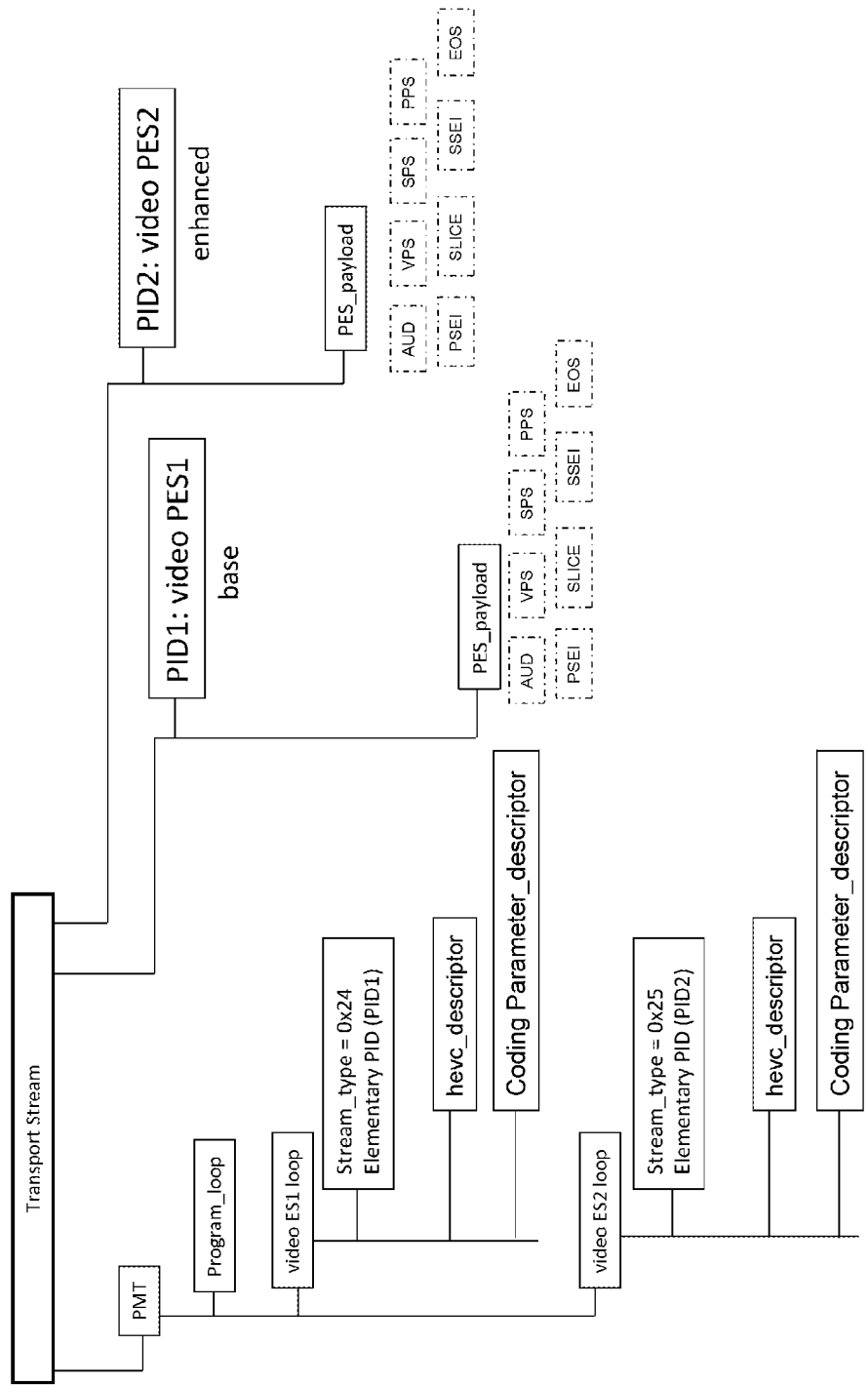
FIG. 8 is a diagram illustrating a configuration example of a transport stream TS in the case of performing distribution by multiple streams.

FIG. 8 illustrates a configuration example of the transport stream TS in the case of performing distribution by multiple streams, here, by two streams. This transport stream TS includes two video streams. That is, according to this configuration example, there is a PES packet "video PES1" for the base stream and there also is a PES packet "video PES2" for the enhanced stream. Encoded image data of each picture included in a PES payload is constituted by NAL units such as "AUD", "VPS", "SPS", "PPS", "PSEI", "SLICE", "SSEI", and "EOS".

Additionally, the program map table (PMT) is included in the transport stream TS as program specific information (PSI). This PSI is information mentioning which program is the one to which each elementary stream included in the transport stream belongs. The PMT has a program loop (Program loop) stating information relating to the entire program. In addition, the PMT has an elementary stream loop having information relating to each of the elementary streams. According to this configuration example, there are two video elementary stream loops (video ES1 loop and video ES2 loop) in this configuration example.

Information such as a stream type and a packet identifier (PID) is arranged in the respective video elementary stream loops in correspondence with the video streams (video PES1 and video PES2) and at the same time, descriptors stating information relating to these video streams are also arranged therein. As one of such descriptors, an HEVC descriptor (HEVC_descriptor) and the above-described coding parameter descriptor (Coding Parameter_descriptor) are inserted.

Note that, in the configuration example of the transport stream TS illustrated in FIG. 8, the coding parameter descriptor is inserted in each video elementary stream loop. However, a configuration example in which the coding parameter descriptor is arranged only in the video elementary stream loop corresponding to the base stream is also conceivable.

The action of the transmission device 100 illustrated in FIG. 4 will be briefly described. The moving image data VD that is not compressed and constitutes the distribution image sequence is input to the encoder 102. In the encoder 102, the encoding processing such as H.264/AVC or H.265/HEVC is applied to this moving image data VD and one video stream is generated in the case of the single stream distribution, while two video streams of the base stream and the enhanced stream are generated in the case of the multiple stream distribution. This video stream is supplied to the multiplexer 103.

In the multiplexer 103, the video stream is converted into the PES packet and further converted into the transport packet to be multiplexed, whereby the transport stream TS is obtained as a multiplexed stream. This transport stream TS includes, for example, only the base stream or both of the base stream and the enhanced stream.

In addition, in the multiplexer 103, the information on the frame rate and the resolution and the information indicating whether the super high-definition video distribution is delivered are inserted into the layer of the transport stream TS as a container. These pieces of information are inserted as descriptors into the inside of the video elementary stream loop arranged under the program map table in correspondence with the video stream. Specifically, in the multiplexer 103, the coding parameter descriptor to be newly defined (refer to FIG. 5) is inserted together with the HEVC descriptor.

The transport stream TS generated by the multiplexer 103 is sent to the transmitting unit 104. In the transmitting unit 104, this transport stream TS is modulated by a modulation scheme suitable for broadcasting such as QPSK/OFDM and an RF modulation signal is transmitted from a transmission antenna.

[Configuration of Reception Device]

Figure 9:
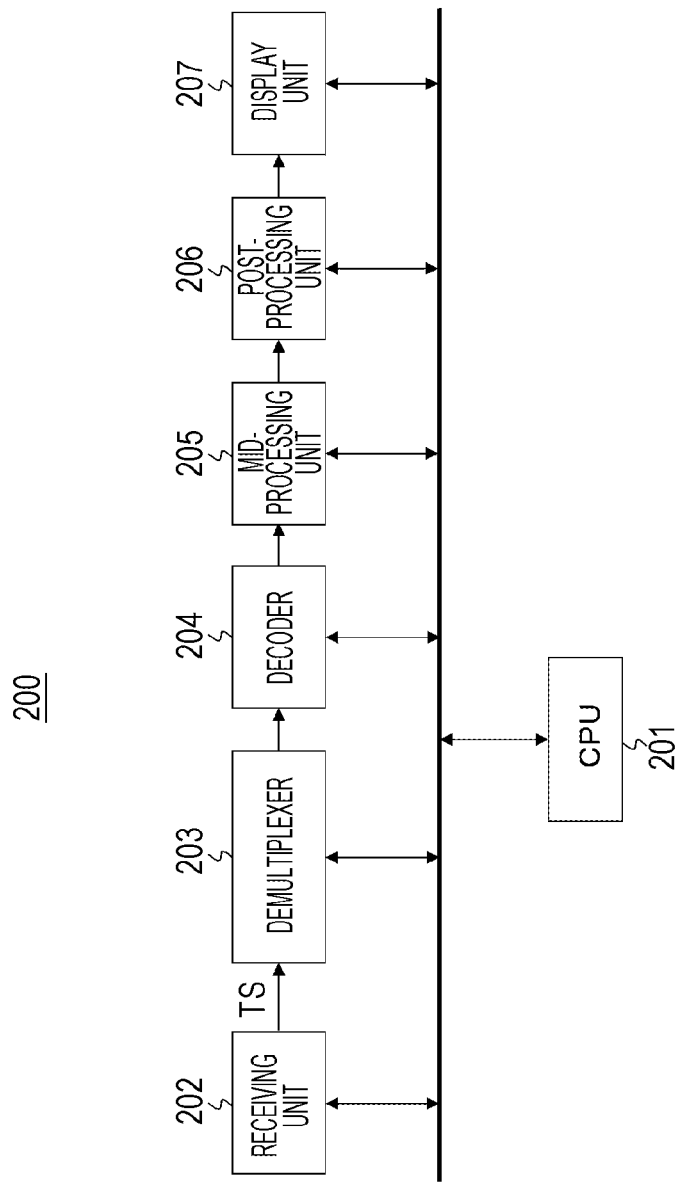
FIG. 9 is a block diagram illustrating a configuration example of a reception device.

FIG. 9 illustrates a configuration example of the reception device 200. This reception device 200 has a central processing unit (CPU) 201, a receiving unit 202, a demultiplexer 203, a decoder 204, a mid-processing unit (image processing unit) 205, a post-processing unit (interpolation processing unit) 206, and a display unit 207. The CPU 201 constitutes a control unit and controls the action of each member of the reception device 200.

The receiving unit 202 receives the transport stream TS sent from the transmission device 100 by being incorporated into the broadcasting wave or a packet in a network. In this transport stream TS, one video stream is included in the case of the single stream distribution and the two video streams of the base stream and the enhanced stream are included in the case of the multiple stream distribution.

The demultiplexer 203 takes out one video stream from the transport stream TS in the case of the single stream distribution and takes out only the base stream or both of the base stream and the enhanced stream therefrom in accordance with the decoding capability of the decoder 204 in the case of the multiple stream distribution, through filtering by PID to supply to the decoder 204. In this case, in a case where the multiple stream distribution is delivered and both of the base stream and the enhanced stream are taken out, both of the streams are integrated into one video stream on the basis of decoding timing information and supplied to the decoder 204.

The demultiplexer 203 also extracts section information included in the layer of the transport stream TS to send to the CPU 201. In this case, the coding parameter descriptor (refer to FIG. 5) is extracted as well. As a result, the CPU 201 can obtain the information on the frame rate and the resolution of the moving image according to the distribution and additionally, the information indicating whether the super high-definition video distribution is delivered.

The decoder 204 applies decoding processing to the video stream supplied from the demultiplexer 203 to acquire moving image data at a predetermined frame rate and a predetermined resolution. The post-processing unit 206 adjusts the frame rate of the moving image data acquired by the decoder 204 to the display capability by generating an interpolation frame using an interframe motion vector. For example, when the frame rate of the moving image data acquired by the decoder 204 is 30 Hz, 60 Hz, and 120 Hz and the display capability is 240 Hz, the frame rate is converted into 240 Hz.

The mid-processing unit 205 is interposed between the decoder 204 and the post-processing unit 206. When the ratio of the frame rate of the moving image data obtained by the decoder 204 to the camera shutter speed falls below a threshold value (for example, 50%), the mid-processing unit 205 performs filtering processing for raising the degree of correlation between adjacent frames on this moving image data under the control of the CPU 201. By performing this filtering processing, the post-processing unit 206 can perform frame interpolation satisfactorily with a conventional frame interpolation technology.

Figure 10:
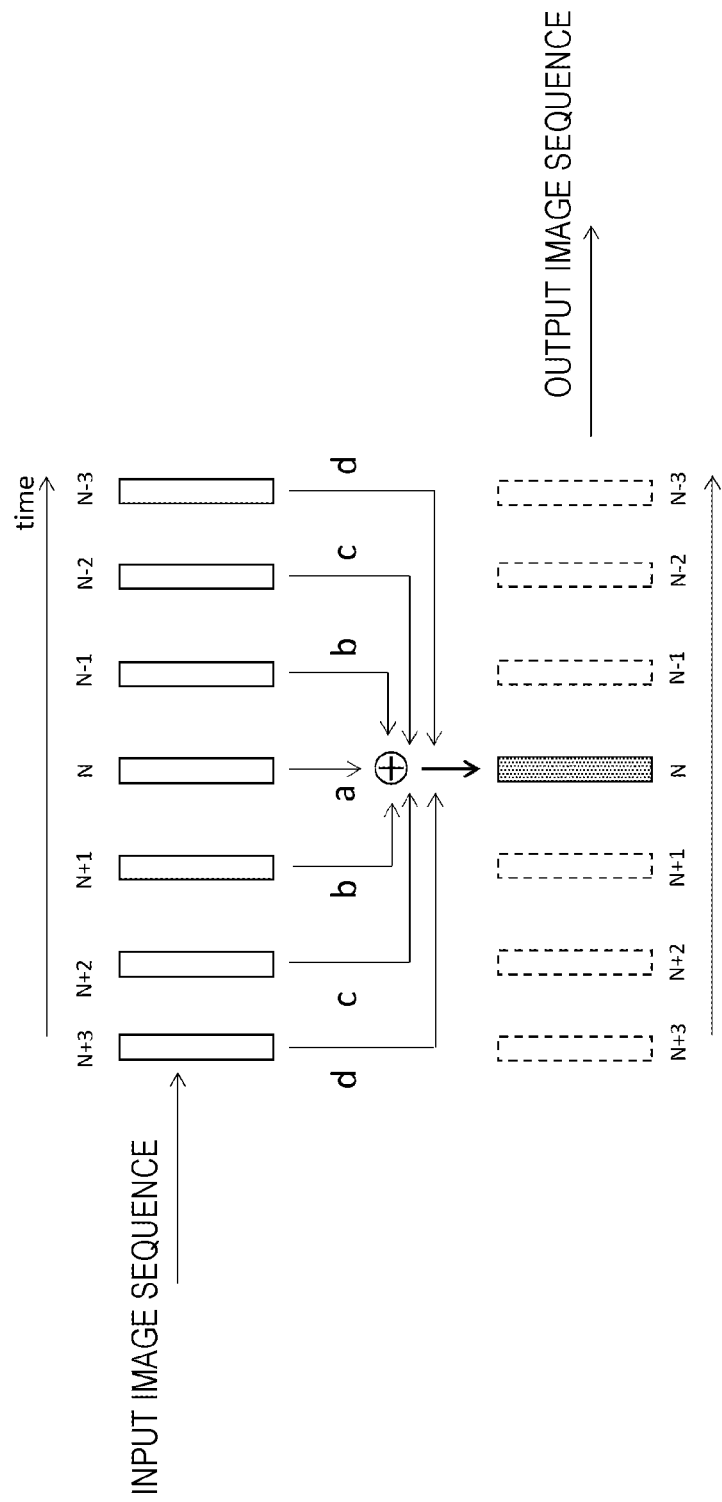
FIG. 10 is a diagram schematically illustrating an example of filtering processing in a mid-processing unit.

FIG. 10 schematically illustrates an example of the filtering processing in the mid-processing unit 205. A current frame of an input image sequence and a predetermined number of frames before and after the current frame are weighted and added to obtain the current frame of an output image sequence. For example, when the current frame is an N frame, individual frames of N−3, N−2, N−1, N, N+1, N+2, N+3 of the input image sequence are weighted by coefficients d, c, b, a, b, c, d, respectively, and added to each other, whereby the N frame of the input image sequence is obtained. For example, "4/8, 2/8, 1/8, 1/8", "2/4, 1/4, 1/4, 0", and the like can be considered as an example of the coefficients "a, b, c, d". Note that the number of taps and the coefficient values are not limited to this example. The number of taps and the coefficient values can be set in accordance with the number of frames contributing to interpolation and the selection of the filter effect.

When the ratio of the frame rate to the camera shutter speed falls below the threshold value, the mid-processing unit 205 supplies the moving image data as a result of the filtering processing (the output image sequence in FIG. 10) to the post-processing unit 206. On the other hand, when the ratio of the frame rate to the camera shutter speed is equal to or larger than the threshold value, the mid-processing unit 205 supplies the moving image data obtained by the decoder 204 to the post-processing unit 206 as it is.

The CPU 201 determines whether the ratio of the frame rate of the moving image data obtained by the decoder 204 to the camera shutter speed falls below the threshold value. For example, it is also conceivable to directly give information on the camera shutter speed from the transmission device 100 to the reception device 200 by inserting the information into the transport stream TS as a container. Alternatively, it is also conceivable to directly give information on the camera shutter speed to the reception device 200 by a user's input operation.

In this embodiment, the CPU 201 estimates the camera shutter speed on the basis of the information on the frame rate and the resolution obtained from the coding parameter descriptor. The CPU 201 holds a shutter speed estimation table fixed in advance between transmitting and receiving parties and refers to this table to estimate the camera shutter speed.

FIG. 11 illustrates an example of the shutter speed estimation table. In this example, "Normal Shutter Speed" means that the same speed as the frequency of the frame rate is employed. Meanwhile, "Short Shutter Speed" means a speed value faster than "Normal Shutter Speed". For example, "Short Shutter Speed" corresponding to a frame rate of 60 Hz and a resolution of 3840×2160 is assigned to 120 Hz or 240 Hz, and so forth.

Figure 12:
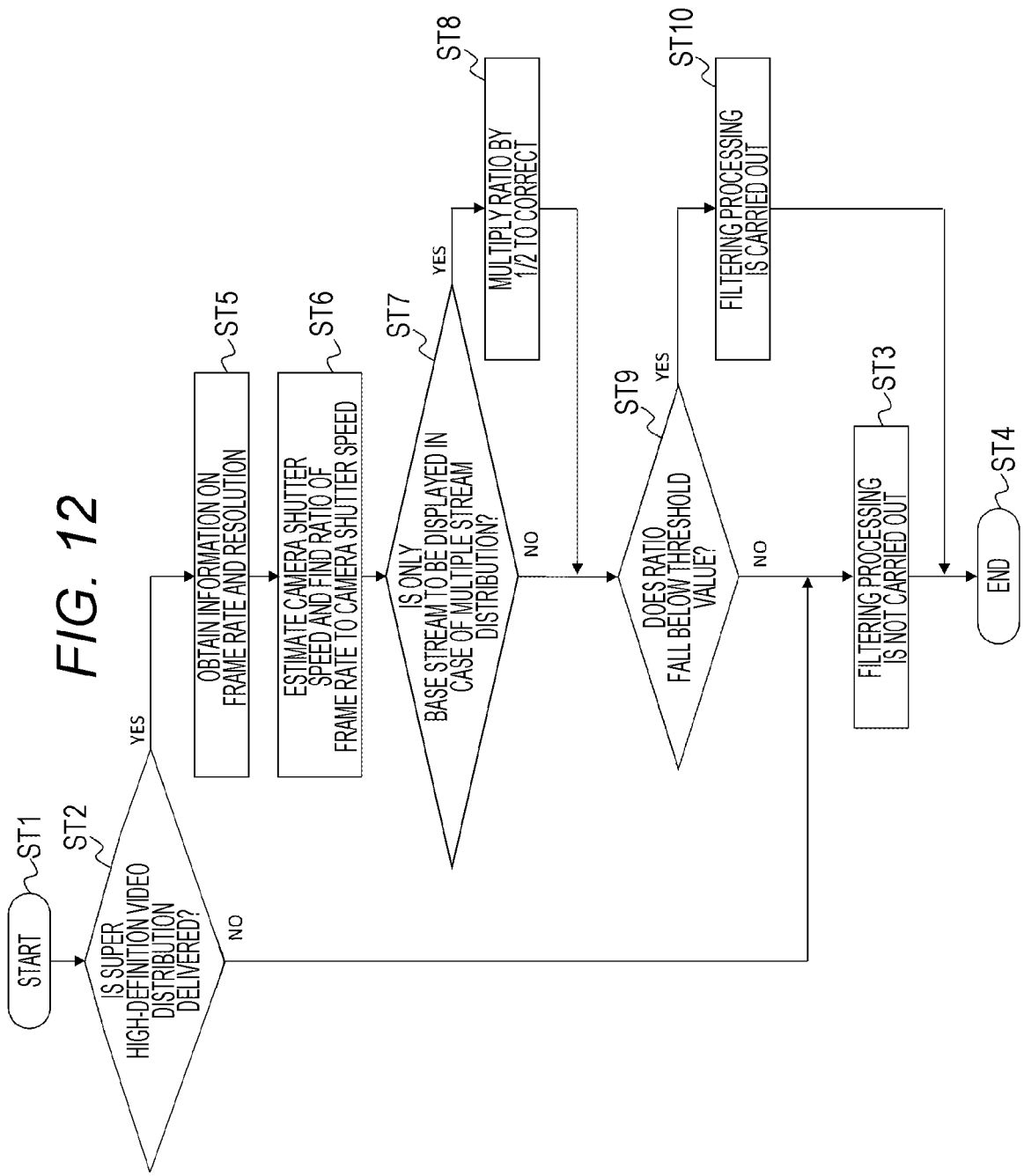
FIG. 12 is a flowchart illustrating an example of control processing for the mid-processing unit by a CPU.

The flowchart in FIG. 12 illustrates an example of control processing for the mid-processing unit 205 by the CPU 201. In step ST1, the CPU 201 starts the processing. Thereafter, in step ST2, the CPU 201 determines whether the high-definition video distribution is delivered. The CPU 201 makes this determination on the basis of the information "service_quality_type" indicating whether the super high-definition video distribution is delivered, which is obtained from the coding parameter descriptor (refer to FIG. 5).

When the high-definition video distribution is not delivered, the CPU 201 controls the mid-processing unit 205 such that the filtering processing is not carried out in step ST3 and thereafter ends the processing in step ST4. In this case, the mid-processing unit 205 is placed in a state of supplying the moving image data obtained by the decoder 204 to the post-processing unit 206 as it is.

On the other hand, when the high-definition video distribution is delivered, the CPU 201 proceeds to processing in step ST5. In this step ST5, the CPU 201 obtains the information on the frame rate and the resolution. The CPU 201 acquires this information from, for example, the coding parameter descriptor (refer to FIG. 5). Note that the CPU 201 also can obtain this information from the NAL unit of the SPS of the video stream.

Next, in step ST6, the CPU 201 refers to the shutter speed estimation table (refer to FIG. 11) and estimates the camera shutter speed on the basis of the information on the frame rate and the resolution obtained in step ST5. Then, in this step ST6, the CPU 201 finds the ratio of the frame rate to the camera shutter speed.

Next, in step ST7, the CPU 201 determines whether to display only the base stream in the case of the multiple stream distribution. In a case where the multiple stream distribution is delivered and only the base stream is decoded by the decoder 204, the CPU 201 proceeds to processing in step ST8. In this step ST8, the CPU 201 multiplies the ratio found in step ST6 by ½ to correct. Thereafter, the CPU 201 proceeds to processing in step 9.

On the other hand, in a case where the single stream distribution is delivered or in a case where the multiple stream distribution is delivered and both of the base stream and the enhanced stream are decoded by the decoder 204, the CPU 201 immediately proceeds to step ST9 from step ST7. In this step ST9, the CPU 201 determines whether the ratio falls below the threshold value.

When the ratio is equal to or larger than the threshold value, the CPU 201 controls the mid-processing unit 205 such that the filtering processing is not carried out in step ST3 and thereafter ends the processing in step ST4. On the other hand, when the ratio falls below the threshold value, the CPU 201 controls the mid-processing unit 205 such that the filtering processing is carried out in step ST10 and thereafter ends the processing in step ST4. In this case, the mid-processing unit 205 is placed in a state of supplying the moving image data as a result of the filtering processing to the post-processing unit 206.

Note that, in the flowchart in FIG. 12, the processing in step ST2 is not necessarily required and control processing excluding this processing is also conceivable. In that case, the CPU 201 immediately proceeds to the processing in step ST5 after starting the processing in step ST1.

Figures 13, 14:
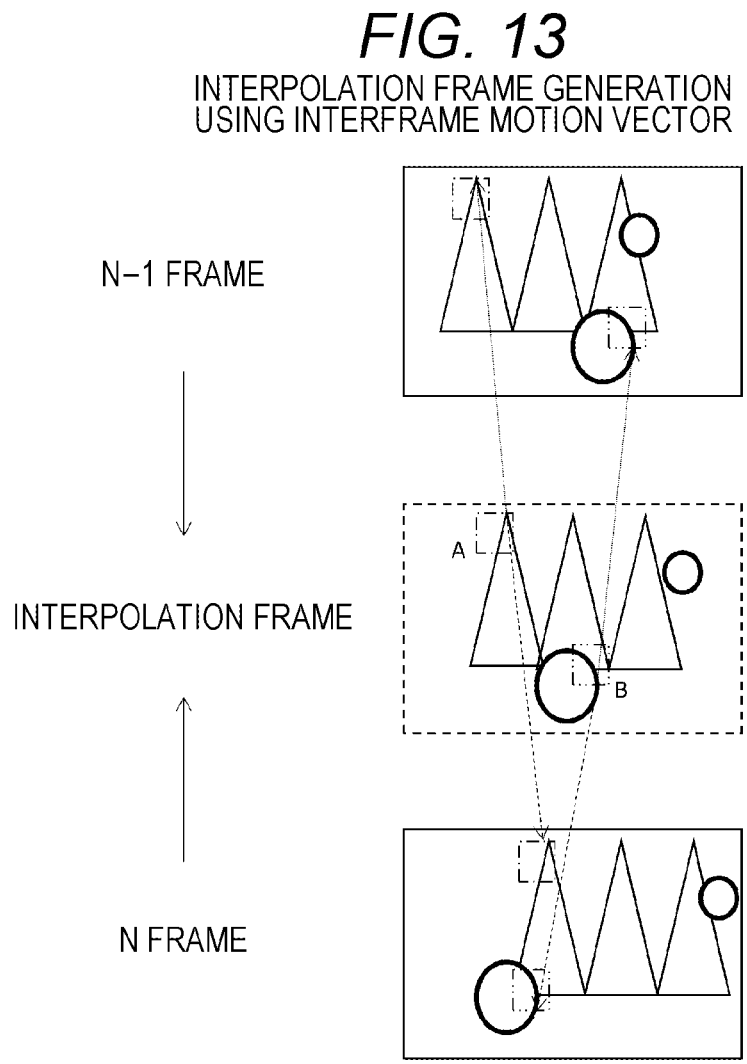
FIG. 13 is a diagram for explaining creation of an interpolation frame using an interframe motion vector.
FIG. 14 is a diagram illustrating an example of the structure of a super high-quality descriptor.

FIG. 13 schematically illustrates an example of interpolation frame generation processing using the interframe motion vector. This example depicts an example where an interpolation frame is generated between the N−1 frame and the N frame. A moving object and a background coexist in a predetermined motion prediction block. Triangles in the background move from left to right in the screen from the N−1 frame to the N frame, while a large circle as the object moves from right to left in the screen.

In a case where an interpolation frame is generated, in the motion prediction for a block A indicated by a one-dot chain line, a texture in the block almost uniformly coincides with the motion vector with respect to prediction for the N−1 frame and prediction for the N frame. However, in regard to a block B indicated by a two-dot chain line, a texture in the block is not uniform in disagreement with the motion vector. In this case, although a large circle portion out of the block B coincides with the motion vector, a background portion is equivalent to a motion different from that of the large circle and thus does not coincide with the motion vector.

As a result, in regard to the block B in the interpolation frame, the large circle portion has good image quality, but the background portion other than that has poor image quality. Meanwhile, in the block A in the interpolation frame, the whole inside of the block is the background portion and the image quality thereof is good. In this manner, the image quality of the interpolation frame has such a result that a difference between good quality and poor quality is noticeable in part.

In addition, since the sharpness of the texture itself is raised as the camera shutter speed becomes faster than the frame rate of the image, there is a case where deterioration in image quality in such an interpolation frame causes a more obvious difference in image quality between a portion where motion prediction is true and a portion where motion prediction is not true.

A method of making the size of the motion prediction block smaller such that the texture included in the block coincides with the motion vector is conceivable. However, extremely small sized blocks bring about high implementation cost.

In order not to cause image quality breakdown due to frame interpolation by conventional motion prediction, it is conceivable to lower the sharpness of the texture in a case where the camera shutter speed is fast (refer to the mid-processing unit 205 in FIG. 9).

When an interpolation image is generated by the conventional motion prediction from an image with the sharpness of the custure lowered as described above, the sharpness is reduced and interpolation is performed using a somewhat blurred image. Consequently, a difference in image quality due to non-coincidence with the motion vector between the large circle portion and the background portion in the block B is made smaller and the breakdown of the entire image can be prevented.

Returning to FIG. 9, the display unit 207 displays a moving image according to the moving image data obtained by the post-processing unit 206. This display unit 207 is constituted by, for example, a liquid crystal display (LCD) or an organic electro-luminescence (organic EL) panel. Note that this display unit 207 may be an external apparatus connected to the reception device 200.

The action of the reception device 200 illustrated in FIG. 9 will be briefly described. In the receiving unit 202, the RF modulation signal received by a reception antenna is demodulated and the transport stream TS is acquired. This transport stream TS is sent to the demultiplexer 203. In the demultiplexer 203, a video stream on which decoding processing is to be carried out is taken out from the transport stream TS through filtering by PID.

In this case, one video stream is taken out in the case of the single stream distribution and only the base stream or both of the base stream and the enhanced stream are taken out in accordance with the decoding capability of the decoder 204 in the case of the multiple stream distribution. The video stream taken out in such a manner is supplied to the decoder 204.

In addition, in the demultiplexer 203, the section information included in the layer of the transport stream TS is extracted to be sent to the CPU 201. In this case, the coding parameter descriptor (refer to FIG. 5) is extracted as well. As a result, the CPU 201 can obtain the information on the frame rate and the resolution of the moving image according to the distribution and additionally, the information indicating whether the super high-definition video distribution is delivered.

In the decoder 204, decoding processing is applied to the video stream supplied from the demultiplexer 203 such that moving image data at a predetermined frame rate and a predetermined resolution is obtained. This moving image data is supplied to the post-processing unit 206 via the mid-processing unit 205. In the mid-processing unit 205, when the ratio of the frame rate of the moving image data obtained by the decoder 204 to the camera shutter speed falls below the threshold value (for example, 50%), the filtering processing for raising the degree of correlation between adjacent frames is performed on this moving image data under the control of the CPU 201.

Therefore, when the ratio of the frame rate to the camera shutter speed falls below the threshold value, the moving image data as a result of the filtering processing (the output image sequence in FIG. 10) is supplied from the mid-processing unit 205 to the post-processing unit 206. On the other hand, when the ratio of the frame rate to the camera shutter speed is equal to or larger than the threshold value, the moving image data obtained by the decoder 204 is supplied from the mid-processing unit 205 to the post-processing unit 206 as it is.

In the post-processing unit 206, the frame rate of the moving image data is adjusted to the display capability by generating the interpolation frame using the interframe motion vector. This moving image data processed by the post-processing unit 206 is supplied to the display unit 207 and a moving image is displayed.

As described above, in the transmission/reception system 10 illustrated in FIG. 1, the filtering processing for raising the degree of correlation between adjacent frames is performed by the mid-processing unit 205 in the reception device 200 on the moving image data obtained by the decoder 204 when the ratio of the frame rate thereof to the camera shutter speed falls below the threshold value. Therefore, the post-processing unit 206 can perform frame interpolation satisfactorily with a conventional frame interpolation technology.

In addition, in the transmission/reception system 10 illustrated in FIG. 1, the camera shutter speed is estimated in the reception device 200 on the basis of the information on the frame rate and the resolution and this estimated camera shutter speed is used to find the ratio of the frame rate of the moving image data obtained by the decoder 204 to the camera shutter speed. Therefore, it becomes unnecessary to transmit information on the camera shutter speed from the transmission device 100 to the reception device 200.

Meanwhile, in the transmission/reception system 10 illustrated in FIG. 1, the coding parameter descriptor including the information on the frame rate and the resolution is inserted by the transmission device 200 into the layer of the transport stream TS as a container. Therefore, a receiving side can easily acquire the information on the frame rate and the resolution from this coding parameter descriptor.

Additionally, in the transmission/reception system 10 illustrated in FIG. 1, the coding parameter descriptor including the information indicating whether the high-definition video distribution is delivered is inserted by the transmission device 200 into the layer of the transport stream TS as a container. Therefore, it becomes possible for a receiving side to perform the filtering processing on only the moving image data having a high sharpness image component captured with a high-speed frame shutter using the mid-processing unit 205 on the basis of that information indicating whether the high-definition video distribution is delivered. That is, it is possible to avoid wastefully performing the filtering processing.

2. Variations

Note that the above embodiments have illustrated an example where the transmission device 100 inserts the coding parameter descriptor including the information on the frame rate and the resolution into the layer of the transport stream TS as a container. However, since the reception device 200 can acquire the information on the frame rate and the resolution from the NAL unit of the SPS of the video stream, a configuration in which this coding parameter descriptor is not inserted is also conceivable.

Figures 15, 16:
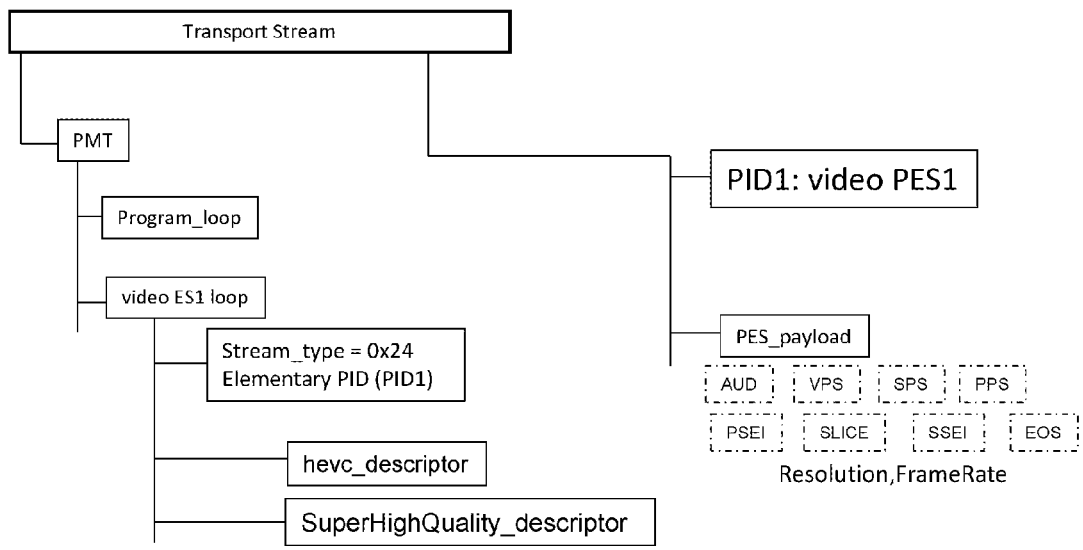
FIG. 15 is a diagram illustrating a configuration example of a transport stream TS in the case of performing distribution by a single stream.
FIG. 16 is a diagram illustrating an example of the structure of a frame quality descriptor.

Additionally, in that case, it is also conceivable to insert, into the layer of the transport stream TS as a container, a descriptor with a structure obtained by removing the information on the frame rate and the resolution from the coding parameter descriptor. FIG. 14 illustrates an example of the structure of a super high-quality descriptor (SuperHigh-Quality_descriptor) to be newly defined in that case (Syntax). In addition, FIG. 15 illustrates an example of a TS structure in that case (single stream distribution).

Meanwhile, the above embodiments have illustrated an example where the reception device 200 estimates the camera shutter speed from the information on the frame rate and the resolution to find the ratio of the frame rate to the camera shutter speed. However, a configuration for transmitting this information on the ratio from the transmission device 100 to the reception device 200 is also conceivable. In this case, this information on the ratio is inserted into the layer of the transport stream TS as a container and/or the layer of the video stream.

For example, this information on the ratio is inserted as a descriptor into the inside of the video elementary stream loop arranged under the program map table in correspondence with the video stream. For example, the multiplexer 103 inserts a frame quality descriptor (FrameQuality_descriptor) to be newly defined. FIG. 16 illustrates an example of the structure of the frame quality descriptor (Syntax). FIG. 17 illustrates the contents of primary information (Semantics) in the above example of the structure.

An eight-bit field of "framequality_descriptor_tag" represents a descriptor type. "framequality_descriptor_tag" here represents that it is a frame quality descriptor. An eight-bit field of "framequality_descriptor length" represents a length (size) of the descriptor and indicates the number of subsequent bytes as the length of the descriptor. "framequality_descriptor length" here represents three bytes.

A four-bit field of "service_quality_type" represents whether the super high-definition video distribution is delivered. "0×01" indicates that the super high-definition video distribution is delivered. "0×10" indicates that merely high-definition video distribution is delivered. A one-bit field of "temporal_scalablility_flag" represents whether a multiple stream configuration having temporal scalability is used. "1" indicates that the multiple stream configuration having the temporal scalability is used. "0" indicates that a single stream configuration not having the temporal scalability is used.

A three-bit field of "ratio_shutter_speed_vs_frame_rate" represents the ratio of an image frame rate to the camera shutter speed. For example, "0×0" indicates 100% (the shutter speed is the same as the image frame rate), "0×1" indicates 50% (the shutter speed is twice the image frame rate), "0×2" indicates 33% (the shutter speed is three times the image frame rate), and "0×3" indicates 25% (the shutter speed is four times the image frame rate).

Figures 18, 19:
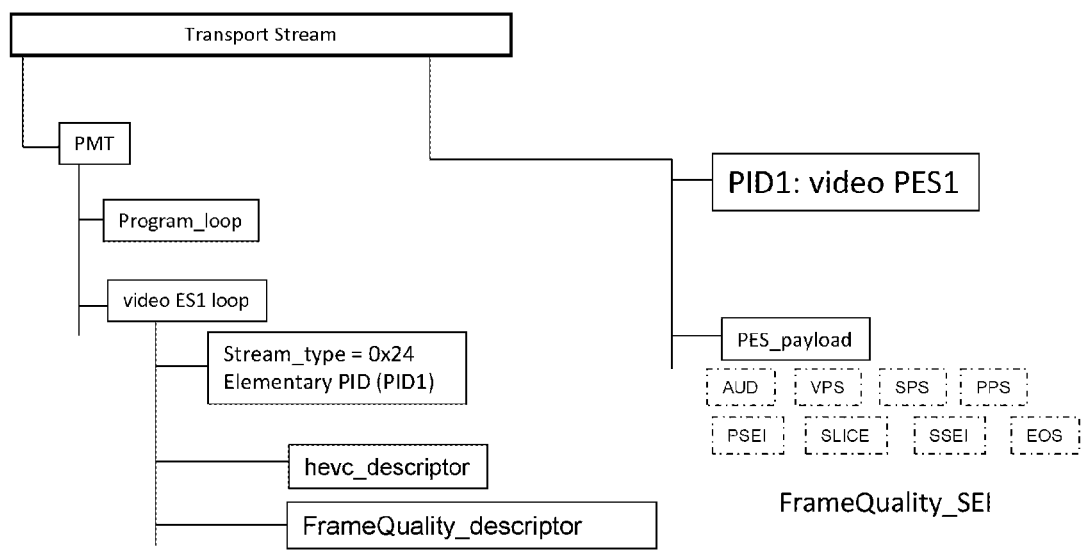
FIG. 18 is a diagram illustrating an example of the structure of a frame quality SEI message.
FIG. 19 is a diagram illustrating a configuration example of a transport stream TS in the case of performing distribution by a single stream.

In addition, for example, this information on the ratio is inserted as an SEI message into an "SEIs" portion of an access unit (AU) of the video stream. The encoder 102 inserts a frame quality SEI message (FrameQuality SEI message) to be newly defined. FIG. 18 illustrates an example of the structure of the frame quality SEI message (Syntax).

One-bit flag information of "FrameQuality_cancel_flag" represents whether this message is to be refreshed. "0" indicates that the message is to be refreshed. "1" indicates that the message is not to be refreshed, that is, a previous message is maintained as it is. Note that information in the respective fields of "service_quality_type", "temporal_scalablility_flag", and "ratio_shutter_speed_vs_frame_rate" is the same information as that described in the aforementioned frame quality descriptor (refer to FIG. 17).

Figure 20:
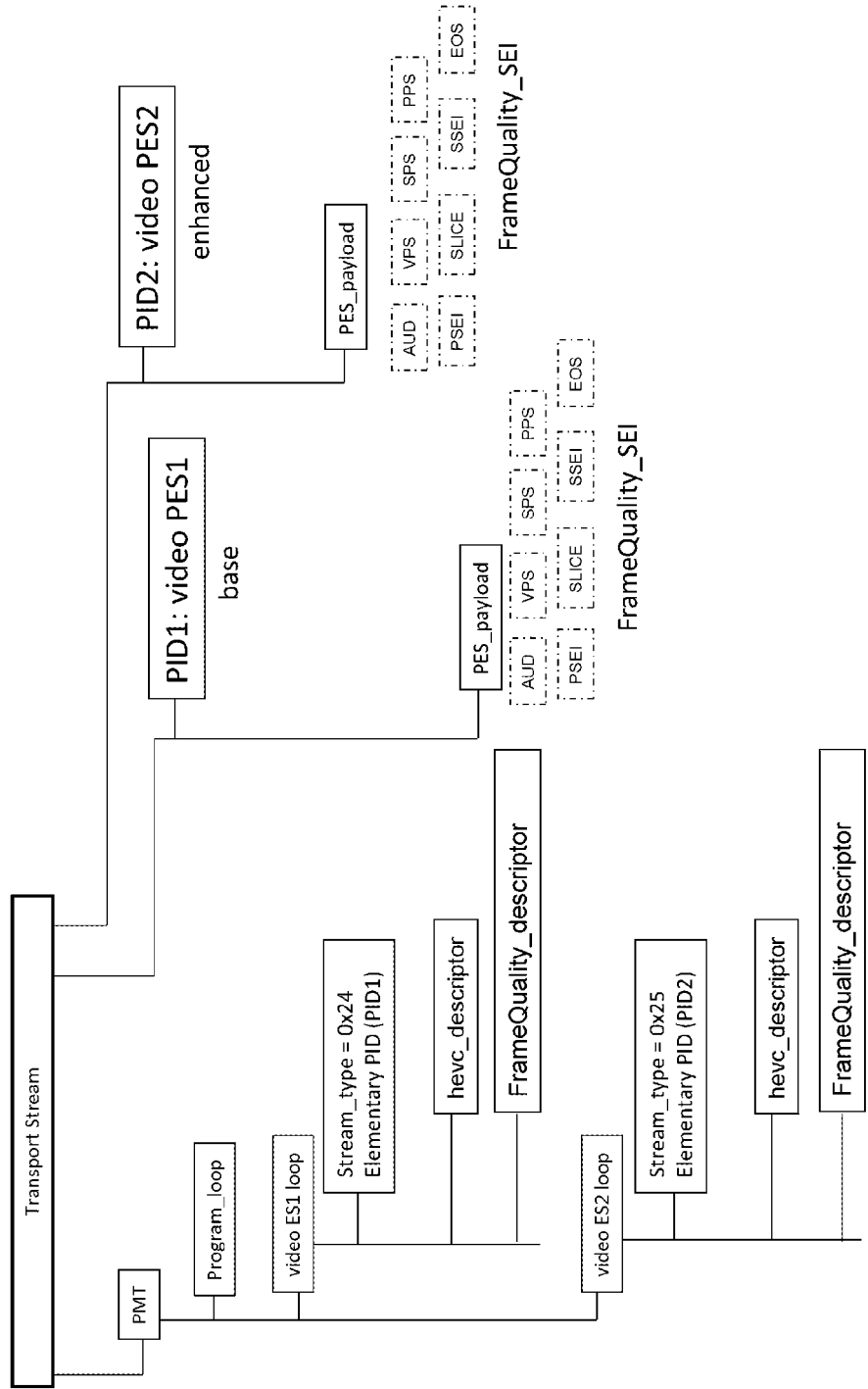
FIG. 20 is a diagram illustrating a configuration example of a transport stream TS in the case of performing distribution by multiple streams.

FIG. 19 illustrates a configuration example of the transport stream TS in the case of performing distribution by a single stream. FIG. 20 illustrates a configuration example of the transport stream TS in the case of performing distribution by multiple streams, here, by two streams. The frame quality SEI message (refer to FIG. 18) is inserted as an SEI message. In addition, the frame quality descriptor (refer to FIG. 16) is inserted into the video elementary stream loop. Note that, in FIGS. 19 and 20, both of the frame quality SEI message and the frame quality descriptor are inserted, but it is also conceivable to insert only one of them.

Figure 21:
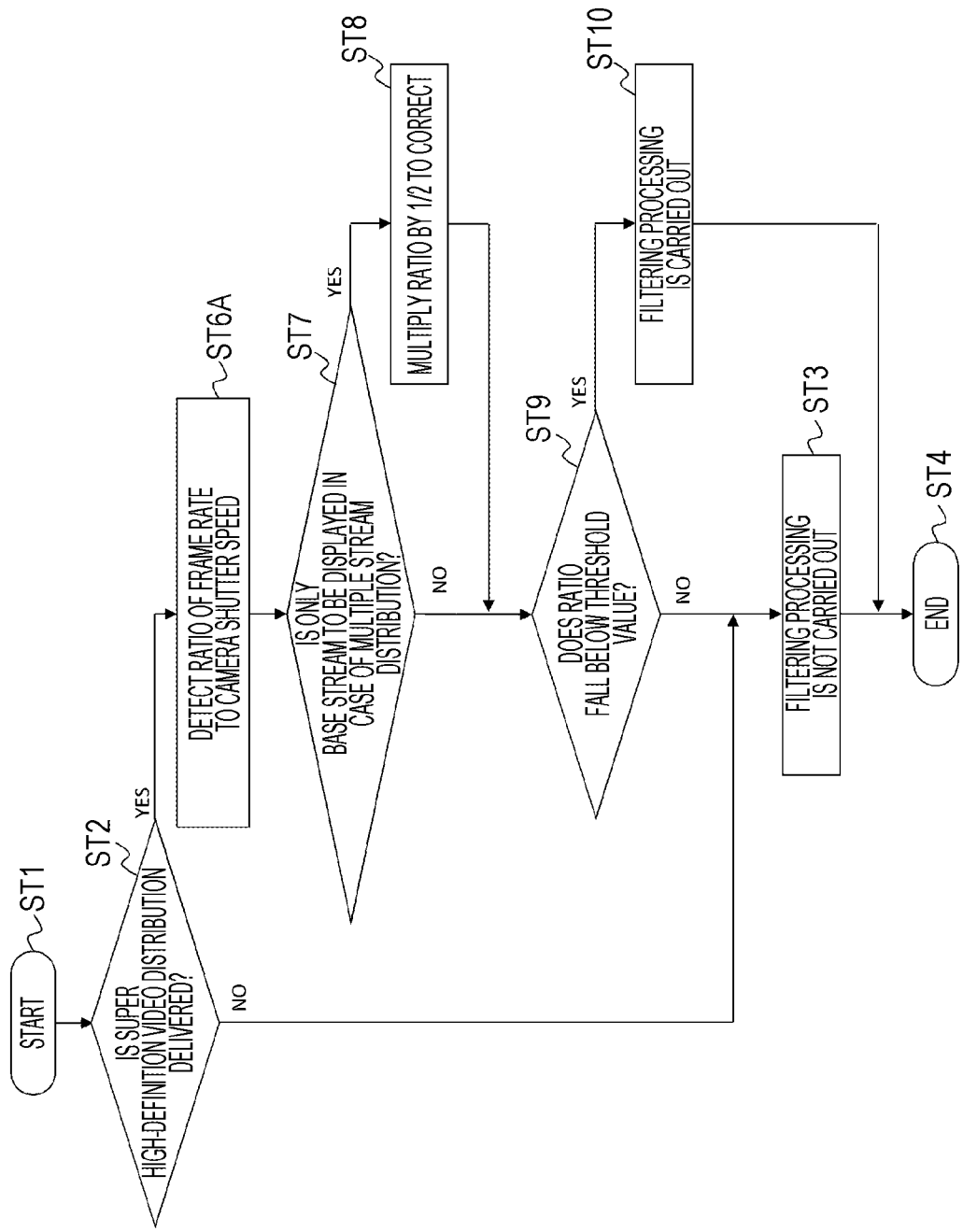
FIG. 21 is a flowchart illustrating an example of control processing for a mid-processing unit by a CPU.

The flowchart in FIG. 21 illustrates an example of control processing for the mid-processing unit 205 by the CPU 201 in a case where the information on the ratio of the frame rate to the camera shutter speed is sent from the transmission device 100. This FIG. 21 illustrates members corresponding to those in FIG. 12 with the same reference numerals attached.

When the high-definition video distribution is delivered in step ST1, the CPU 201 proceeds to processing in step ST6A. In this step ST6A, the CPU 201 detects the ratio of the frame rate to the camera shutter speed from the frame quality descriptor or the frame quality SEI message. After this step ST6A, the CPU 201 proceeds to processing in step ST7. Although detailed description is omitted, the other processing is the same as the processing in the flowchart in FIG. 12.

Figure 22:
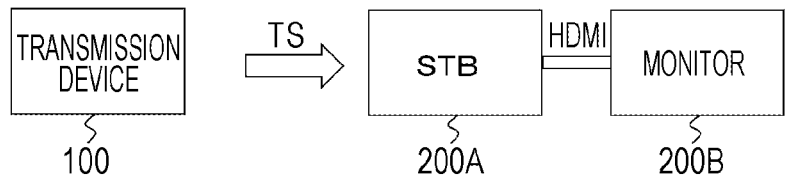
FIG. 22 is a block diagram illustrating another configuration example of the transmission/reception system.

In addition, the above embodiments have indicated the transmission/reception system 10 constituted by the transmission device 100 and the reception device 200. However, the configuration of the transmission/reception system to which the present technology can be applied is not limited thereto. For example, a transmission/reception system 10A as illustrated in FIG. 22 is also conceivable. In this transmission/reception system 10A, a portion for the reception device 200 in the transmission/reception system 10 in FIG. 1 is configured as a set top box 200A and a monitor 200B connected through a digital interface such as the high-definition multimedia interface (HDMI). Note that "HDMI" is a registered trademark.

In this case, in the configuration of the reception device 200 illustrated in FIG. 9, for example, a portion up to the decoder 204 is included in the set top box 200A and the mid-processing unit 205 and the following members are included in the monitor 200B. In the monitor 200B, the camera shutter speed can be estimated on the basis of the information on the frame rate and the resolution inserted in the blanking period of the moving image data at the predetermined frame and the predetermined resolution transmitted from the set top box 200A and this estimated camera shutter speed can be used to find the ratio of the frame rate of the moving image data to the camera shutter speed.

Note that a configuration in which the information on the ratio of the frame rate to the camera shutter speed is sent from the set top box 200A to the monitor 200B via an HDMI interface is also conceivable. This information on the ratio is inserted, for example, into the blanking period of the moving image data when sent. In this case, it becomes unnecessary for the monitor 200B to estimate the camera shutter speed on the basis of the information on the frame rate and the resolution to find the ratio.

In addition, in this case, it is also conceivable to employ a configuration in which, in the configuration of the reception device 200 illustrated in FIG. 9, for example, a portion up to the mid-processing unit 205 is included in the set top box 200A and the post-processing unit 206 and the following members are included in the monitor 200B.

Additionally, the above embodiments have indicated an example in which the transport stream (MPEG-2 TS) serves as the container. However, the present technology can be similarly applied to a system configured to perform distribution to receiving terminals using a network such as the Internet. In the distribution using the Internet, distribution is often performed in a container of MP4 or a format other than MP4. In other words, containers of various formats such as a transport stream (MPEG-2 TS) adopted in a digital broadcasting standard and MP4 used in Internet distribution fall within the containers.

Note that the present technology can be also configured as described below.

(1) An image processing device including:

an image data acquiring unit that acquires moving image data at a predetermined frame rate and a predetermined resolution; and an image processing unit that performs filtering processing for raising the degree of correlation between adjacent frames on the acquired moving image data when a ratio of the predetermined frame rate to a camera shutter speed falls below a threshold value.

(2) The image processing device according to (1) above, in which the image processing unit estimates the camera shutter speed on the basis of information on the frame rate and the resolution.

(3) The image processing device according to (1) or (2) above, in which the image data acquiring unit receives a container in a predetermined format including a video stream obtained by applying encoding processing to the moving image data and acquires the moving image data by applying decoding processing to the video stream.

(4) The image processing device according to (3) above, in which the image processing unit estimates the camera shutter speed on the basis of information on the frame rate and the resolution inserted in a layer of the container.

(5) The image processing device according to (3) above, in which the image processing unit estimates the camera shutter speed on the basis of information on the frame rate and the resolution inserted in a layer of the video stream.

(6) The image processing device according to (3) above, in which information on the ratio of the frame rate to the camera shutter speed is inserted in a layer of the container and/or a layer of the video stream, and the image processing unit obtains the ratio of the predetermined frame rate to the camera shutter speed on the basis of the information on the ratio inserted in the layer of the container and/or the layer of the video stream.

(7) The image processing device according to (1) or (2) above, in which the image data acquiring unit acquires the moving image data from an external apparatus via a digital interface.

(8) The image processing device according to (7) above, in which the image processing unit estimates the camera shutter speed on the basis of information on the frame rate and the resolution inserted in a blanking period of the moving image data.

(9) The image processing device according to (7) above, in which the image processing unit acquires information on the ratio of the frame rate to the camera shutter speed from the external apparatus via the digital interface and, on the basis of the information on the ratio, obtains the ratio of the predetermined frame rate to the camera shutter speed.

(10) The image processing device according to any one of (1) to (9) above, in which the image data acquiring unit receives a container in a predetermined format including a video stream obtained by applying encoding processing to the moving image data and acquires the moving image data by applying decoding processing to the video stream, and in a case where information indicating whether super high-definition video distribution is delivered, which is inserted in a layer of the container, indicates that the super high-definition video distribution is delivered, the image processing unit performs the filtering processing for raising the degree of correlation between adjacent frames on the acquired moving image data when the ratio of the predetermined frame rate to the camera shutter speed falls below the threshold value.

(11) An image processing method including:

an image data acquiring step of acquiring moving image data at a predetermined frame rate and a predetermined resolution; and an image processing step of performing filtering processing for raising the degree of correlation between adjacent frames on the acquired moving image data when a ratio of the predetermined frame rate to a camera shutter speed falls below a threshold value.

(12) A reception device including:

a receiving unit that receives a container in a predetermined format including a video stream obtained by applying encoding processing to moving image data;

a decoding unit that applies decoding processing to the video stream to obtain moving image data at a predetermined frame rate and a predetermined resolution;

interpolation processing unit that adjusts the frame rate of the moving image data obtained by the decoding unit to a display capability by generating an interpolation frame using an interframe motion vector; and an image processing unit that is interposed between the decoding unit and the interpolation processing unit and performs filtering processing for raising the degree of correlation between adjacent frames on the moving image data obtained by the decoding unit when a ratio of the predetermined frame rate to a camera shutter speed falls below a threshold value.

(13) A reception device including:

a receiving unit that receives moving image data at a predetermined frame rate and a predetermined resolution from an external apparatus via a digital interface;

interpolation processing unit that adjusts the frame rate of the moving image data received by the receiving unit to a display capability by generating an interpolation frame using an interframe motion vector; and an image processing unit that is interposed between the receiving unit and the interpolation processing unit and performs filtering processing for raising the degree of correlation between adjacent frames on the received moving image data when a ratio of the predetermined frame rate to a camera shutter speed falls below a threshold value.

(14) A transmission device including:

an image encoding unit that generates a video stream by applying encoding processing to moving image data;

a transmitting unit that transmits a container in a predetermined format including the video stream; and an information inserting unit that inserts, into a layer of the container, information on a frame rate and a resolution corresponding to information on a frame rate and a resolution inserted in a layer of the video stream.

(15) The transmission device according to (14) above, in which the information inserting unit further inserts information indicating whether super high-definition video distribution is delivered into the layer of the container.

(16) A transmission device including:
an image encoding unit that generates a video stream by applying encoding processing to moving image data;
a transmitting unit that transmits a container in a predetermined format including the video stream; and
an information inserting unit that inserts information indicating whether super high-definition video distribution is delivered into a layer of the container.

(17) A transmission device including:
an image encoding unit that generates a video stream by applying encoding processing to moving image data;
a transmitting unit that transmits a container in a predetermined format including the video stream; and
an information inserting unit that inserts information on a ratio of a frame rate to a camera shutter speed into a layer of the container and a layer of the video stream.

(18) The transmission device according to (17) above, in which
the information inserting unit further inserts information indicating whether super high-definition video distribution is delivered into the layer of the container and the video stream.

The main feature of the present technology is that, by performing the filtering processing for raising the degree of correlation between adjacent frames on the moving image data when the ratio of the frame rate thereof to the camera shutter speed falls below the threshold value, it is made possible to perform frame interpolation satisfactorily with a conventional frame interpolation technology (refer to FIGS. 9 to 12).

REFERENCE SIGNS LIST 10, 10A Transmission/reception system
100 Transmission device
101 CPU
102 Encoder
103 Multiplexer
104 Transmitting unit
200 Reception device
200A Set top box
200B Monitor
201 CPU
202 Receiving unit
203 Demultiplexer
204 Decoder
205 Mid-processing unit
206 Post-processing unit
207 Display unit

The invention claimed is:

1. An image processing device comprising:
image data acquiring circuitry configured to receive a container and acquire moving image data included in the container at a first frame rate and a first resolution, the moving image data comprising frames from an original image sequence having an original frame rate corresponding to a camera shutter speed, the first frame rate and the original frame rate differing in accordance with a conversion process that generates the moving image data from the original image sequence; and
image processing circuitry configured to
acquire an indication whether a ratio of the first frame rate to the camera shutter speed falls below a threshold value,
when information inserted in a layer of the container indicates that super high-definition video distribution is delivered, perform filtering processing on adjacent frames of the acquired moving image data in response to an indication that the ratio of the first frame rate to the camera shutter speed falls below the threshold value, and
in response to an indication that the ratio does not fall below the threshold value, not perform the filtering processing.

2. The image processing device according to claim 1, wherein
the image processing circuitry is configured to estimate the camera shutter speed on the basis of information on the first frame rate and the first resolution.

3. The image processing device according to claim 1, wherein the image data acquiring circuitry is configured to receive the container including a video stream obtained by applying encoding processing to the moving image data and acquires the moving image data by applying decoding processing to the video stream.

4. The image processing device according to claim 3, wherein
the image processing circuitry is configured to estimate the camera shutter speed on the basis of information on the first frame rate and the first resolution inserted in a layer of the container.

5. The image processing device according to claim 3, wherein
the image processing circuitry is configured to estimate the camera shutter speed on the basis of information on the first frame rate and the first resolution inserted in a layer of the video stream.

6. The image processing device according to claim 3, wherein
information on the ratio of the first frame rate to the camera shutter speed is inserted in a layer of the container and/or a layer of the video stream, and
the image processing circuitry is configured to obtain the ratio of the first frame rate to the camera shutter speed from the information inserted in the layer of the container and/or the layer of the video stream.

7. The image processing device according to claim 1, wherein
the image data acquiring circuitry is configured to acquire the moving image data from an external apparatus via a digital interface.

8. The image processing device according to claim 7, wherein
the image processing circuitry is configured to estimate the camera shutter speed on the basis of information on the first frame rate and the first resolution inserted in a blanking period of the moving image data.

9. The image processing device according to claim 7, wherein
the image processing circuitry is configured to acquire information on the ratio of the first frame rate to the camera shutter speed from the external apparatus via the digital interface.

10. An image processing method comprising:
receiving a container and acquiring moving image data included in the container at a first frame rate and a first resolution, the moving image data comprising frames from an original image sequence having an original frame rate corresponding to a camera shutter speed, the first frame rate and the original frame rate differing in accordance with a conversion process that generates the moving image data from the original image sequence;

acquiring an indication whether a ratio of the first frame rate to the camera shutter speed falls below a threshold value;

when information inserted in a layer of the container indicates that super high-definition video distribution is delivered, performing filtering processing on adjacent frames of the acquired moving image data in response to an indication that the ratio of the first frame rate to the camera shutter speed falls below the threshold value, and in response to an indication that the ratio does not fall below the threshold value, not performing the filtering processing.

11. A reception device comprising:

receiving circuitry configured to receive a container including a video stream obtained by applying encoding processing to moving image data having a first frame rate and a first resolution, the moving image data comprising frames from an original image sequence having an original frame rate corresponding to a camera shutter speed, the first frame rate and the original frame rate differing in accordance with a conversion process that generates the moving image data from the original image sequence; and control circuitry configured to control
decoding processing of the video stream to obtain the moving image data at the first frame rate and the first resolution,
filtering processing on adjacent frames of the moving image data obtained by the decoding processing in response to an indication that a ratio of the first frame rate to the camera shutter speed falls below a threshold value, and
interpolation processing of adjusting the first frame rate of the moving image data filtered by the filtering processing to a frame rate corresponding to a display capability by generating an interpolation frame using an interframe motion vector.

12. A reception device comprising:

receiving circuitry configured to receive moving image data at a first frame rate and a first resolution from an external apparatus via a digital interface, the moving image data comprising frames from an original image sequence having an original frame rate corresponding to a camera shutter speed, the first frame rate and the original frame rate differing in accordance with a conversion process that generates the moving image data from the original image sequence; and control circuitry configured to control
filtering processing on adjacent frames of the received moving image data in response to an indication that a ratio of the first frame rate to the camera shutter speed falls below a threshold value, and
interpolation processing of adjusting the first frame rate of the moving image data as filtered by the filtering processing to a frame rate corresponding to a display capability by generating an interpolation frame using an interframe motion vector.

* * * * *